INVENTORS.
Clarence M. Hansen
Louis E. Ott

United States Patent Office

3,405,529
Patented Oct. 15, 1968

3,405,529
PREPARATION OF UNDERGROUND
WATER BARRIERS
Clarence M. Hansen, East Lansing, Mich., and Louis E. Ott, St. John, Ind.; said Hansen assignor to Board of Trustees, a constitutional corporation operating Michigan State University of Agriculture and Applied Science, and said Ott assignor to Standard Oil Company, Chicago, Ill., a corporation of Indiana
Continuation-in-part of application Ser. No. 575,150, Aug. 25, 1966. This application Apr. 4, 1967, Ser. No. 628,346
10 Claims. (Cl. 61—1)

ABSTRACT OF THE DISCLOSURE

A continuous flexible subsurface water barrier of congealed thermoplastic material is provided by the separate formation in situ at preselected depth beneath the soil surface of a plurality of barriers wherein a lateral edge of one barrier engages the lower surface of an adjoining barrier.

CROSS-REFERENCES TO RELATED APPLICATIONS

This is a continuation-in-part of application Ser. No. 575,150, filed Aug. 25, 1966, now abandoned.

BACKGROUND OF THE INVENTION

Large areas of land are located in arid and semi-arid areas of the world where, due to the porosity of the soil, insufficient water is retained in the plant root zone to make such land suitable for agricultural or grazing purposes. As the population of the world continues to grow, need for using this marginal land for agricultural purposes becomes more pressing. Formerly, it was believed that this type of marginal land could not compete with the more fertile land and thus such marginal property was unsuitable for agricultural purposes. In many areas, good agricultural land is becoming sufficiently scarce so as to create a need for economical and easily applied methods for reclaiming sandy and other porous soils which lack sufficient water retention properties for agricultural purposes.

The upward migration of subsurface moisture is an ever present problem in many soils. For example, such moisture is extremely damaging to roads in temperate zones where alternate freezing and thawing produces frost boils and subsequent road destruction. This problem is especially acute in plastic or clayey soils where adequate drainage cannot be effected.

Field of the invention

The present invention relates to a simple and economical method for the preparation in situ of artificial water barriers in soils at desired depths beneath the soil surface to control the migration of water in soils.

Description of the prior art

Subsurface water barriers of thermoplastic materials especially asphalt, as well as other materials have been used heretofore for the purpose of controlling the migration of water in soils.

Buried asphalt membranes are formed by "cut and fill" techniques wherein the soil is excavated, then a layer of asphalt is sprayed on the open surface and after it is congealed and hardened sufficiently to withstand a load, the asphalt coating is covered with soil. This technique requires substantial quantities of asphalt such as, ¾–1.5 gals. of asphalt per sq. yd. to achieve a satisfactory membrane for load support and water control.

Hydraulic techniques are frequently used to inject thermoplastic materials into soils to provide subsurface water barriers. Hydraulic injection requires substantial quantities of sealing material because there is uncontrollable flow of the liquid material which must penetrate the soil and fill the voids between soil particles before any barrier action will accrue. Exemplary of such technique is U.S. Patent 2,201,459.

Tomlinsen in U.S. Patent 668,362 describes in situ formation of underground water barriers or troughs made from cementitious materials for collecting and holding water.

An in situ technique for forming asphaltic water barriers underground is described by Bolt in U.S. Patent 3,276,208. The present invention is an improvement on the technique disclosed in this patent.

SUMMARY

The method of the present invention for forming in situ a continuous flexible subsurface water barrier of congealed thermoplastic material, said barrier composed of a plurality of separately formed barriers having finite dimensions, each separate barrier in transverse section having a central portion continuous with lateral side portions wherein each side portion is inclined relative to said central portion, comprises:

(I) forming a first barrier at a preselected depth beneath the soil surface by the steps of:
  (a) forming along a selected path a translating cavity having a transverse dimension greater than its longitudinal dimension in the direction of translation, by continuously displacing soil upwardly at said depth and supporting said displaced soil to form said cavity having a supported upper portion and a lower exposed soil portion and simultaneously shaping said exposed soil portion to provide directly beneath said supported upper portion a transversely exposed soil surface having a central portion and inclined lateral side portions;
  (b) concurrently depositing on said exposed soil surface with minimal mixing liquid thermoplastic material, said material having a congealing temperature above the temperature of said exposed soil and which is flexible when congealed on said surface, to cover and form on said surface a congealing coating of said material; and
  (c) continuously covering said coating and closing said cavity by free flow of said supported soil whereby said first barrier is formed; and
(II) forming an adjoining barrier in a path parallel to the first path and at a preselected depth to engage said first barrier by repeating the steps employed in forming the first barrier and including continuously intersecting the adjacent lateral side portion of said first barrier to form and expose a new lateral edge of said side portion in the exposed soil portion of the second-provided translating cavity and depositing said thermoplastic material on said exposed soil surface in contact with said exposed lateral edge, thus joining said first barrier and said adjoining barrier to provide a continuous water barrier laterally and longitudinally by separately formed barriers.

The amount of liquid thermoplastic material deposited on the exposed soil will usually be sufficient to form a coating having a thickness of about $\frac{1}{32}$ to about $\frac{1}{16}''$ or about .15–.5 gal. per sq. yd. of surface covered. It is to be understood that greater amounts can be used when barriers of substantial thickness are desired.

The thermoplastic material suitable for barrier formation can be any material that can be liquified by heat to a pumpable viscosity and which has a congealing temperature above ground temperature and further is flexible when in the congealed or hardened state. Exemplary of such materials are synthetic resinous materials such as polyethylene, polypropylene and asphalt. Any commercial asphalt that is non-liquid at ambient temperatures can be used. Such asphalts are characterized as having softening points in the range of 100 to 300° F. and a penetration less than 300 at 77° F. Such asphalts having a wax content of not more than 10%, preferably less than 5%, can also be used.

It has been found that the thermoplastic material can be used per se so long as it is in liquid form when deposited in the cavity. Or, if desired, an aqueous emulsion of the material can be formed and used, provided the emulsion, either anionic or cationic, is broken immediately in the cavity so that the dispersed material can coalesce and form a continuous coating on the exposed soil surface which immediately starts to congeal on contact with the soil. Migration of the coating into the soil prior to closure results in permeable barriers. When emulsions are used, conventional breaking agents well known in the art are employed with the proviso that such agents be anhydrous and in gaseous form when in contact with the emulsion.

Conventional aqueous cationic (acidic) asphalt emulsions are preferred for use in this invention. It has been found that the use of the "rapid set" type of emulsions, which are well known to the art, is essential to the formation of satisfactory subterranean asphalt water barriers in accordance with this invention. The "rapid set" emulsions are of the type that can quickly break and set to a continuous asphalt film upon application. The formation of these emulsions is well known to the art. Suitable emulsions for use at ambient temperatures consist essentially of 55–70 weight percent of an asphalt having a penetration of about 60–300, preferably 150–200, at 77° F., an amount of cationic emulsifying agent sufficient to form a "rapid set" emulsion, about 0.05 to 0.75 weight percent; and the balance, water. Suitable emulsifying agents for use in preparing these emulsions include primary, secondary, tertiary, and polyamine salts. These salts are usually formed in the aqueous emulsifying solution by the reaction of the amine with an acid such as hydrochloric. These emulsions can be made so that they are stable for storage and transportation yet will rapidly break when applied in accordance with the invention.

When the translating cavity is closed by the free flow of supported soil, the coating of thermoplastic material is covered with the soil followed by compaction due to the weight of soil above the coating. Inasmuch as the liquid coating starts to congeal as soon as it is deposited on the exposed soil in the cavity, the extent of such congealing determines the nature of the barrier formed. The barrier is a filled thermoplastic layer having a soil particle gradient across its cross-section. With highly viscous coatings there will be very little migration of the coating due to compaction and penetration of soil particles into the coating so that a substantially continuous layer of thermoplastic material is present in the center of the barrier. On the other hand, compaction of slightly viscous coatings spreads the material and permits further penetration by the soil particles. Consequently, the resultant barrier having finite dimensions may vary from ⅛ to ¼ inch in thickness. However, the completed barrier of thermoplastic material and soil mixture must contain at least 20% thermoplastic material as the continuous phase to have water impermeability.

It is to be understood that thermoplastic materials can be used alone or in admixture with other polymeric materials of synthetic or natural origin. For example, asphalt can be used neat or in admixture with materials miscible therewith and susceptible to thermal liquifaction.

DESCRIPTION OF THE PREFERRED EMBODIMENTS

Figure 1:
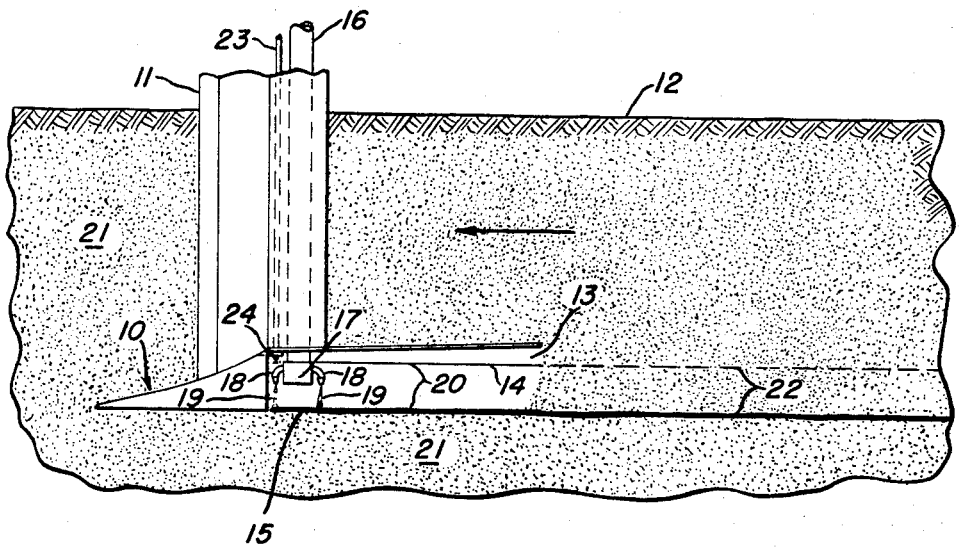
FIG. 1 is a side elevational view showing apparatus suitable for forming underground water barriers in situ.

*Example 1.*—The in situ formation of an underground water barrier will be described in connection with FIG. 1. Wedge-shaped subterranean plow 10, attached to shank 11 which, in turn, is attached to a tractor, not shown, is pulled in the direction of the arrow at a preselected depth below the soil surface 12. As the subterranean plow 10 is moved forward, a translating cavity 13 is continuously formed with the exposed side 14 and bottom 15 soil surfaces thereof unsupported and exposed to the interior of the cavity. Liquid thermoplastic material is introduced via line 16 and manifold 17 through spray nozzles 18 as liquid spray 19 in a direction transverse to the direction of translation of the cavity 13. It is desirable that manifold 17 be provided with a plurality of spray nozzles 18 across the width of the cavity. Preferably, spray 19 has a flat fan-shaped pattern. The liquid thermoplastic spray 19 forms a continuous coating 20 on the exposed soil surfaces of the side walls 14 and bottom 15 of cavity 13. As plow 10 moves forward through the soil, the cavity is continuously closed by the free flow of the supported soil 21 above the cavity thereby forming the completed underground water barrier 22.

*Example 2.*—When an aqueous emulsion of the thermoplastic material is used, an anhydrous gaseous atmosphere of the appropriate breaking agent is first established in cavity 13 prior to introduction of the emulsion thereto. This is accomplished by first introducing the gaseous agent via line 23 and distributing means 24, FIG. 1. Thereafter, the aqueous emulsion is introduced via line 16, manifold 17, and spray nozzles 18 as liquid spray 19 to the cavity 13. The emulsion spray 19 is immediately broken on contact with the anhydrous gaseous breaking agent whereby the dispersed particles of the thermoplastic material immediately coalesce and form a continuous coating of the thermoplastic material on the exposed soil surfaces of cavity 13. When anhydrous ammonia is used as the breaking agent for cationic emulsions, it is essential that the ammonia be completely gaseous because any liquid ammonia that might be present would be trapped in or below the coating 20 and when it vaporized would leave holes in the coating.

For agricultural purposes, the barrier should be deep enough to permit cultivation of the root zone without disturbing barrier 22. However, barrier 22 should not be so deep that the roots of the plants will not be nourished by the water trapped by such barrier. The depth of the barrier below the surface will vary with the type of plant grown in the root zone. Usually from 20 to 36 inches will be found satisfactory.

Figure 2:
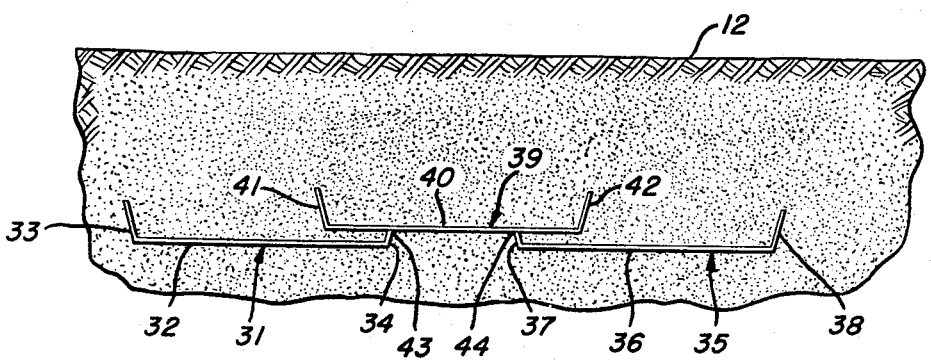
FIG. 2 is a cross-sectional view depicting a plurality of barriers that have been joined to provide a barrier against water migration over a larger area.

*Example 3.*—In accordance with this invention, subterranean asphalt water barriers were installed in a one-acre to three-acre test plots in Grayling sand in Northwestern Michigan. An aqueous cationic asphalt emulsion containing of about 65 weigh percent asphalt having a penetration of about 150–200 at 77° F., about 0.2 weight percent N-tallow-1,3-propylene diamine and about 0.1 weight percent concentrated hydrochloric acid to form the amine hydrochloride as emulsifying agent, about 0.1 weight percent calcium chloride as emulsion stabilizer, and the balance, water, was prepared. This emulsion was applied at rates of about 1000 to 2500 gallons per acre, at tractor speeds of about one to two miles per hour, at a nozzle pressure of 14–16 p.s.i., and at depths of 22 and 24 inches on 24-inch centers with a plow having a width of 34 inches, length of 32 inches, and a height of 5" with about 12 inches of cavity from the spray nozzles to the trailing edge of the plow. Spray orifices were about 4 inches from the bottom surface of the cavity. The length of each continuous asphalt strip was about 200 feet. The ammonia flow to the cavity was about 17–24 pounds per acre. A continuous asphaltic barrier was formed across the width of the plots by first forming parallel but non-contiguous strips at a depth of about 24 inches on 48-inch centers. Then the plow level was raised so that the bottom of the plow was at 22 inches and passed between the previously laid strips, again on 48-inch centers so that the plow intersected the adjacent side walls of the individual strips formed at the 24-inch depth. The asphalt coating in the bottom of the upper pass connected with the cut and exposed upstanding edge of the lower strip in the exposed bottom of the upper cavity and effectively formed an asphalt seal between the upper and lower strips. This is shown in FIG. 2 wherein parallel strips 31 having a bottom 32 and side walls 33 and 34, and strip 35 having bottom 36 and sidewalls 37 and 38, are separately formed at the 24-inch depth. Thereafter strip 39 having side walls 41 and 42 and bottom 40, is formed at the 22-inch level with its center line between the lower strips 31 and 35. As the plow moves along its path, it intersects and cuts the upstanding wall 34 of strip 31 and wall 37 of strip 35 so that the asphalt film is exposed in the bottom of the cavity. Bottom 40 of strip 39 then seals the cut edges at 43 and 44 thereby forming a continuous asphalt barrier across the width of the field. Such joining technique provides the formation of a tight underground water barrier of asphalt or thermoplastic material wherever it is necessary to place a plurality of barrier strips in situ so as to achieve the desired protection of any given area against water migration. Exploratory holes dug in representative locations in the test and adjacent soil areas showed that continuous barriers having an average thickness of about $3/32$ to about $1/4$ inch were formed; and an artificial water table was established throughout the test area.

At a linear speed of the tractor at one to two miles per hour, the continuously translating cavity of about one foot in length, between the liquid spray distributor and the trailing edge of the plow, is formed and open for about 0.33 to about 0.7 second.

*Example 4.*—A series of barriers were likewise formed as in Example 3 except that no ammonia was used and variou sgrades of straight asphalt, having softening points ranging from about 110 to about 200° F. and penetrations between about 50 and 250 at 77° F. were substituted for the asphalt emulsion. The resultant barriers comprising 25 to 45% asphalt were water impermeable.

Figure 3:
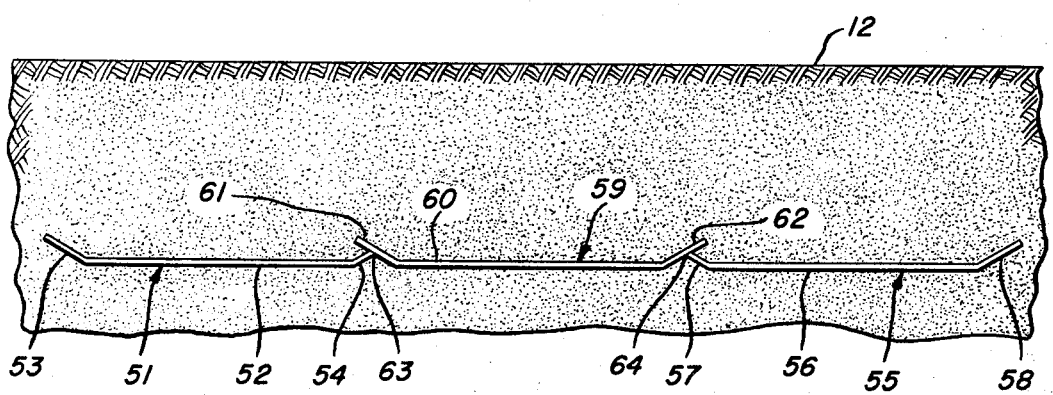
FIG. 3 illustrates a variant in the configuration of the barriers shown in FIG. 2.

The configuration of the barriers illustrated in FIG. 3 is obtained by means of an underground plow that forms a cavity having a substantially flat bottom and upwardly disposed side walls at an angle of about 30°. As the plow moves through the soil, barrier 51 having bottom 52 and upstanding side walls 53 and 54 is formed at the desired depth. Thereafter, barrier 55 having bottom 56 and side walls 57 and 58 is formed parallel to 51 but spaced therefrom and at the same depth. Thereafter, barriers 51 and 55 are joined by forming barrier 59 at the same depth so that the plow intersects walls 54 and 57 and exposes them to the open cavity wherein the thermoplastic coating forming bottom 60 and side walls 61 and 62 of barrier 59 joins and seals the barriers at 63 and 64.

Figure 4:
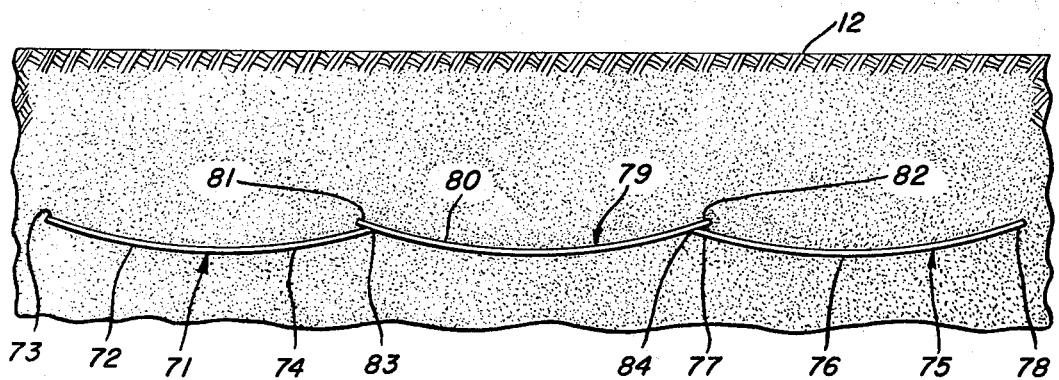
FIG. 4 illustrates another variation in the configuration of the barriers shown in FIG. 2.

In FIG. 4, the configuration of barriers 71, 75, and 79 is produced by a plow having forming means that produces a concave cavity. The bottom portions 74, 76, and 80 of barriers 71, 75 and 79 are thus arcuately curved ending in upwardly disposed side walls 73, 74, 77, 78, 81 and 82. Joining of the parallel barriers is effected by first forming barriers 71 and 75 and then interconnecting them by barrier 79 at junctions 83 and 84.

Serial formation and joining of a plurality of barriers in the manner described in connection with FIGS. 2, 3, and 4 provides for the formation of underground water barriers capable of controlling migration of water throughout large soil areas.

Other applications will be readily apparent to those skilled in the art for utilizing the method of this invention to form subterranean water barriers in situ to control the upward and downward migration of water in soils. It is particularly suitable for forming effective subsurface water barriers in roads built over plastic subgrades having a constant moisture content and thereby prevent upward intrusion of water through capillarity into the road bed. Similarly it can be used to provide barrier protection for canals, irrigation ditches and ponds to prevent water losses therefrom by percolation.

We claim:

1. The in situ method of forming a continuous flexible subsurface water barrier of congealed thermoplastic material, said barrier composed of a plurality of separately formed barriers having finite dimensions, each separate barrier in transverse section having a central portion continuous with lateral side portions wherein each side portion is inclined relative to said central portion and terminates in a lateral edge at an elevation different from the elevation of said central portion, comprising:

(I) forming a first barrier as defined above at a preselected depth beneath the soil surface by the steps of:

(a) forming along a selected path a translating cavity having a transverse dimension greater than its longitudinal dimension in the direction of translation, by continuously displacing soil upwardly at said depth and supporting said displaced soil to form said cavity having a supported upper portion and a lower exposed soil portion and simultaneously shaping said exposed soil portion to provide directly beneath said supported upper portion a transversely exposed soil surface having a central portion and inclined lateral side portions with each side portion terminating at an elevation different from the elevation of the central portion;

(b) concurrently depositing on said exposed soil surface with minimal mixing liquid thermoplastic material, said material having a congealing temperature above the temperature of said exposed soil and which is flexible when congealed on said surface, to cover and form on said surface a congealing coating of said material; and (c) continuously covering said coating and closing said cavity by free flow of said supported soil whereby said first barrier is formed; and (II) forming an adjoining barrier in a path parallel to the first path and at a preselected depth to engage said first barrier by repeating the steps employed in forming the first barrier and including continuously intersecting the adjacent lateral side portion of said first barrier to form and expose a new lateral edge of said side portion in the exposed soil portion of the second-provided translating cavity and depositing said thermoplastic material on said exposed soil surface in contact with said exposed lateral edge, thus joining said first barrier and said adjoining barrier to provide a continuous water barrier laterally and longitudinally by separately formed barriers.

2. The method of claim 1 wherein each lateral side portion of said transversely exposed soil surface in said cavity is inclined upwardly and terminates at an elevation higher than the elevation of the central surface portion; and the lateral edge of each side portion of said separately formed barrier projects higher than the central portion thereof.

3. The method of claim 2 wherein said thermoplastic material is asphalt having a softening point of about 100–300° F. and a penetration of less than 300 at 77° F.

4. The method of claim 3 wherein said thermoplastic material consists of said asphalt and is introduced into said cavity in liquid form and is deposited by spraying transversely to the path of translation.

5. The method of claim 4 wherein the vertical direction of spraying is at an angle within ±15° of perpendicular to the exposed soil surface in said cavity.

6. The method of claim 5 wherein the spray formed has a flat fan-shaped pattern.

7. The method of claim 2 wherein the elevations of the central portions of said separately formed barriers are on substantially the same plane at said preselected depth; and wherein an aqueous emulsion of said thermoplastic material is previously formed, and a gaseous agent for chemically breaking said emulsion is provided in said cavity, which additionally includes in step (I)(b) establishing and continuously maintaining an anhydrous gaseous atmosphere of said chemical breaking agent in said cavity, and introducing a spray of said aqueous emulsion into said gaseous atmosphere whereby said emulsion is quickly broken and said liquid thermoplastic material is deposited and forms said coating on said surface.

8. The method of claim 7 wherein said thermoplastic material is asphalt having a softening point of 100–300° F. and a penetration of less than 300 at 77° F.

9. The method of claim 8 wherein said emulsion is an aqueous cationic emulsion of said asphalt, and said chemical breaking agent is anhydrous ammonia.

10. The method of claim 9 wherein said emulsion contains about 50–70 weight percent of said asphalt.

References Cited

UNITED STATES PATENTS

| | | | |
|---|---|---|---|
| 668,362 | 2/1901 | Tomlinson | 61—13 |
| 1,006,116 | 10/1911 | Morse | 61—72.6 X |
| 1,398,815 | 11/1921 | Trusty et al. | 61—72.2 |
| 1,401,386 | 12/1921 | Woodberry | 61—13 |
| 3,121,973 | 2/1964 | Phillips et al. | 61—36 X |
| 3,276,208 | 10/1966 | Bolt | 61—1 |
| 3,349,568 | 10/1967 | Smith et al. | 61—72.2 |

EARL J. WITMER, *Primary Examiner.*